United States Patent [19]

Brandt et al.

[11] Patent Number: 4,477,350

[45] Date of Patent: Oct. 16, 1984

[54] LIQUID FILTERING APPARATUS

[75] Inventors: Robert H. Brandt, Bowling Green; Merlin P. Hoodlebrink, Bradner, both of Ohio

[73] Assignee: Brandt & Associates, Inc., Bowling Green, Ohio

[21] Appl. No.: 474,783

[22] Filed: Mar. 14, 1983

[51] Int. Cl.$^3$ .............................................. B01D 29/04
[52] U.S. Cl. ..................................... 210/387; 210/401
[58] Field of Search ................. 210/90, 106, 107, 138, 210/250, 297, 386, 387, 400, 401

[56] References Cited

U.S. PATENT DOCUMENTS

| | | | |
|---|---|---|---|
| 3,403,784 | 10/1968 | Blumberg | 210/387 |
| 3,722,682 | 3/1973 | Pistiner | 210/387 |
| 3,731,808 | 5/1973 | Rickert | 210/387 |
| 3,933,650 | 1/1976 | Lentz | 210/387 |
| 4,263,805 | 4/1981 | Isley et al. | 210/387 |
| 4,267,060 | 5/1981 | Miller | 210/387 |
| 4,289,615 | 9/1981 | Schneider et al. | 210/387 |

Primary Examiner—Richard V. Fisher
Assistant Examiner—Wanda L. Millard
Attorney, Agent, or Firm—Allen D. Gutchess, Jr.

[57] ABSTRACT

Apparatus for filtering liquid under pressure through a continuous filtering media is provided. The apparatus includes an elongate filter housing with open ends and a filtering media support is positioned across the housing and extends between the open ends thereof. A supply roll of filter media is located near one end opening and supplies the filtering media through the opening to the support. A takeup roll is located near the other end opening and receives used filter media through the other end opening from the support. A sealing member is provided for each of the end openings to seal the same during a filtering operation. Each sealing member includes a backup plate and a resilient gasket layer which contacts and engages the end of the housing around the opening. A drive unit in the form of a fluid-operated ram includes a piston rod connected to one of the backup plates and a fluid-operated cylinder connected to a transverse supporting bar. Two spaced connecting bars are connected to the transverse bar and extend along sides of the filter housing, where they are movably supported. These bars extend beyond the other end opening where they are connected to a second transverse supporting bar which, in turn, is affixed to the backup plate of the other sealing member. Stops are located near the end openings to limit movement of the sealing members away from the end openings.

20 Claims, 6 Drawing Figures

LIQUID FILTERING APPARATUS

This invention relates to apparatus for filtering liquid under pressure through a continuous filter media.

The filtering apparatus includes an elongate housing having end openings with continuous filter media supplied through one end opening and out the other across a filter media support which extends across the housing and between the end openings. A sealing member is provided for each of the end openings to seal them when in closed positions. At that time, liquid under pressure to be filtered is supplied above the filter media and filtered liquid is removed from the housing below the filter media. From time to time, the sealing members are retracted to open the ends and enable the filter media to be advanced through the housing to supply clean filter media on the support therein. A principal advantage of employing the filter housing with the end seals is that the housing can be made much longer if desired to provide greater filtering capacity without increasing the size of the end openings and the pressure required to maintain the sealing members in their closed, sealing relationship.

Filtering apparatus of this general nature is known in the art, including U.S. Pat. Nos. 3,722,682 and 3,731,808. Filtering apparatus according to those patents has required separate mechanisms for opening and closing the seals which resulted in higher costs, more space consumed, more wear points, and more maintenance.

The filtering apparatus in accordance with the invention provides end sealing members which are opened and closed by a single fluid-operated ram or similar drive unit. The fluid-operated ram is connected between one of the sealing members and a first transverse supporting bar. Two connecting bars extend along and are movably supported on the sides of the filter housing and connect the first transverse bar and a second transverse bar at the opposite end of the housing which is affixed to the second sealing member. Stops are carried by the housing to limit the extent to which the sealing members can move away from the housing to their open positions.

When the sealing members are opened, one of the members moves away from the housing until it engages its stop, at which time, with the ram continuing to operate, the other sealing member moves outwardly until it engages its corresponding stop. When the piston rod is retracted into the cylinder of the ram, one sealing member tends to move until it engages the end of the housing whereupon the other sealing member similarly moves until both are in sealing relationship with the housing at the end openings.

It is, therefore, a principal object of the invention to provide liquid filtering apparatus having improved sealing means.

Another object of the invention is to provide pressure filtering apparatus in which pressure seals are opened and closed by a single actuating or drive unit.

Yet another object of the invention is to provide pressure filtering apparatus which is less expensive, requires less space, and requires less maintenance.

Other objects and advantages of the invention will be apparent from the following detailed description of a preferred embodiment thereof, reference being made to the accompanying drawings, in which.

Figure 1:
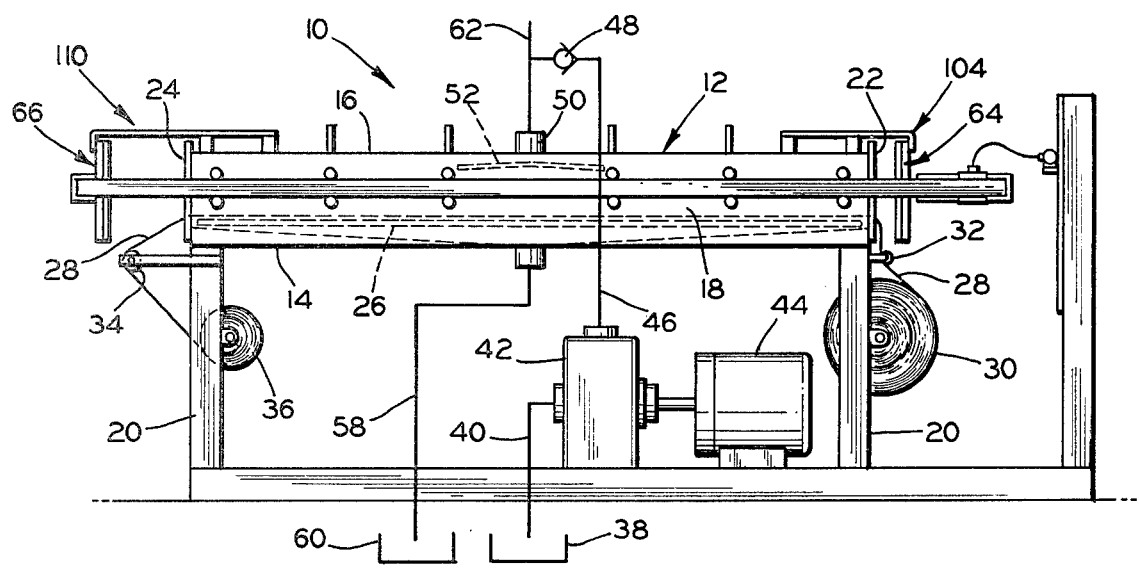
FIG. 1 is an overall schematic side view in elevation of liquid filtering apparatus embodying the invention.

Referring particularly to FIG. 1, overall filtering apparatus embodying the invention is indicated at 10. The apparatus includes an elongate filter housing 12 of rectangular shape in transverse cross section and having a bottom wall 14, a top wall 16, and side walls 18. The housing is mounted on suitable supporting legs 20. A peripheral supply flange 22 is located around a supply opening at a supply end of the housing and a peripheral discharge flange 24 is located around a discharge opening at a discharge end of the housing. A filter media support 26 extends across the housing between the side walls 18 thereof and extends longitudinally of the housing between the end openings. The support 26 can be of many types but preferably is a commercially-available wedge wire screen. Continuous filter media is supplied to the housing and above the filter support 26 from a supply roll 30 and around a guide roll 32. At the discharge end, the filter media extends around a guide roll 34 and is received on a takeup roll 36. Filter cake can be removed from the used filter media 28 by a suitable doctor blade (not shown), if desired, prior to the used filter media being wound up on the takeup roll 36.

Liquid to be filtered is supplied from a suitable source 38 through a line 40 to a pump 42 driven by a motor 44. The liquid is supplied under pressure, commonly from 20 to 40 PSI, through a supply line 46 having a check valve 48 to an inlet 50 in the top wall 16 of the housing. From here, the liquid to be filtered is directed outwardly above the filter media 28 by a distributor plate 52.

The liquid is filtered through the media 28 and through the support 26 where it is collected on an inner slanted drain 54 and is directed to an outlet 56. From here, the filtered liquid drains through a line 58 to a suitable collection tank 60 or the like.

When the filter media 28 is sufficiently plugged or clogged, the pump 42 is shut off and air under pressure is supplied through a line 62 to force the remaining unfiltered liquid above the filter media 28 through the media and out the outlet 56. The air also tends to dry the filter cake on the media 28.

Sealing members 64 and 66 seal off the supply and discharge openings of the housing 12 during the filtering operation. When the filter media within the housing is sufficiently plugged, the sealing members 64 and 66 are moved outwardly away from the flanges 22 and 24. Clean filter media 28 from the supply roll 30 can then be supplied through the supply end opening of the housing over the support 26. The used filter media is discharged through the discharge and opening and is received on the takeup roll 36, with the filter cake removed first, if of sufficient thickness. The need for the filter media to be changed can be indicated by a suitable pressure switch or switches measuring the pressure of the liquid above the filter media in the housing 12 or can be on a timed basis.

The end sealing members 64 and 66 require considerable pressure to seal off the housing ends. However, the end seals require no additional pressure even if the housing 12 is made much longer for greater filter capacity since the ends of the housing remain the same area. In addition, if desired, a plurality of the filter media supports and filter media thereon can be stacked above one another in the filter housing 12, with appropriate filter media used on each support, so that several filtering operations can take place between the inlet 50 and the outlet 56 of the housing.

Figure 5:
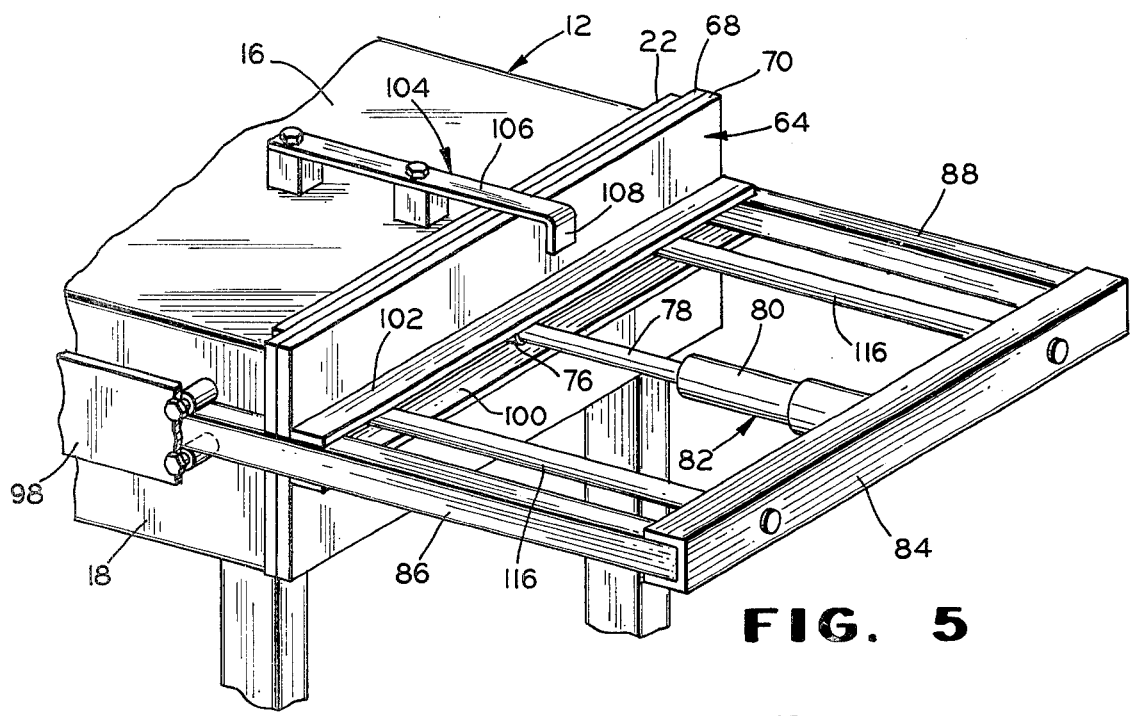
FIG. 5 is an enlarged view in perspective of a sealing member and operating mechanism at one end of the filter housing.
Figure 6:
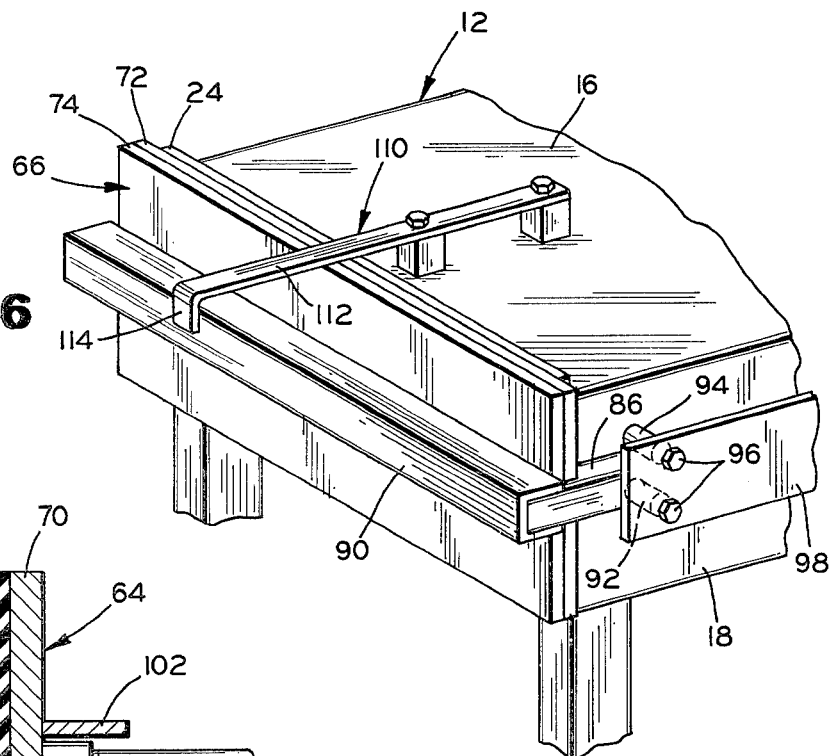
FIG. 6 is a view in perspective of a sealing member at the other end of the filter housing.
Figure 4:
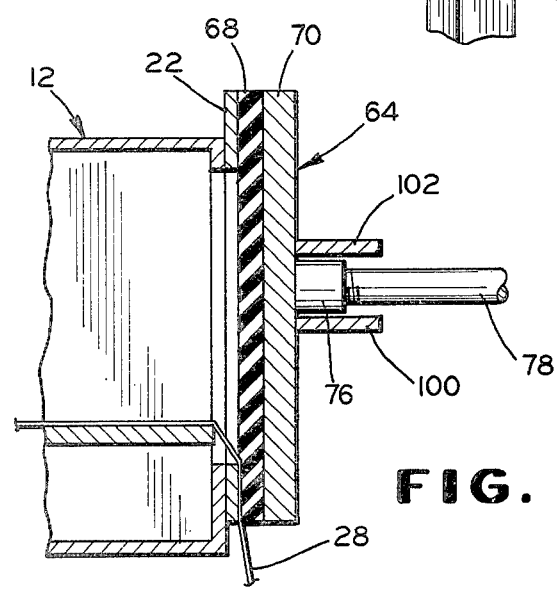
FIG. 4 is an enlarged view in section taken along the line 4—4 of FIG. 3.

Referring to FIGS. 4 and 5, the sealing member 64 at the supply end includes a resilient gasket layer 68 and a backup plate 70. Similarly, the sealing member 66 at the discharge end includes a resilient gasket layer 72 (FIG. 6) and a backup plate 74. When the sealing members are closed, the resilient layers form tight seals with the end flanges 22 and 24. For this purpose, neoprene rubber having a hardness of 50 shore A durometers has been found to be effective when liquid under higher pressures is filtered. When the sealing members 64 and 66 are in their sealing positions, the filter media 28 is clamped between the resilient layer 68 or 72 and the flange 22 or 24 (see FIG. 4). Some bleeding of the filtered liquid occurs through the media at the seals but this is not sufficient to be a detriment.

The sealing members 64 and 66 can be opened and closed by one drive unit such as a fluid-operated ram, connected to the sealing members by relatively simple mechanism. This results in lower costs and the need for less space at the ends of the filter housing. The mechanism also has fewer wear points, resulting in less maintenance and longer life for the sealing mechanism.

Referring to FIGS. 4 and 5, the backup plate 70 of the sealing member 64 has a centrally located threaded connector 76 affixed thereto which receives the threaded end of a piston rod 78. The piston rod 78 is connected to a piston (not shown) in a fluid-operated cylinder 80 of a fluid-operated ram 82. The other end of the cylinder 80 is affixed to a transverse supporting bar 84. Two spaced connecting bars 86 and 88 are connected to ends of the transverse bar 84 and extend along the side walls 18 of the filter housing 12. These bars extend beyond the other end of the housing where they are affixed to a second transverse supporting bar 90 (FIG. 6) which, in turn, is affixed to the outer surface of the back-up plate 74 of the second sealing member 66. At the side walls 18, the connecting bars 86 and 88 are supported on lower rollers 92 and guided by upper rollers 94 rotatably supported on the side walls 18 by suitable shoulder bolts 96 or other fasteners. The bolts 96 also support outer side plates 98 adjacent the connecting bars 86 and 88.

While the second transverse supporting bar 90 is affixed directly to the backup plate 74 of the sealing member 66, the sealing member 64 is slidably supported on the connecting bars 86 and 88 by transverse flanges 100 and 102 which are affixed to the backup plate 70 in parallel relationship and extend outwardly therefrom beyond the side edges of the plate 70 where they slidably engage the connecting bars 86 and 88 to achieve the slidable support.

Figure 2:
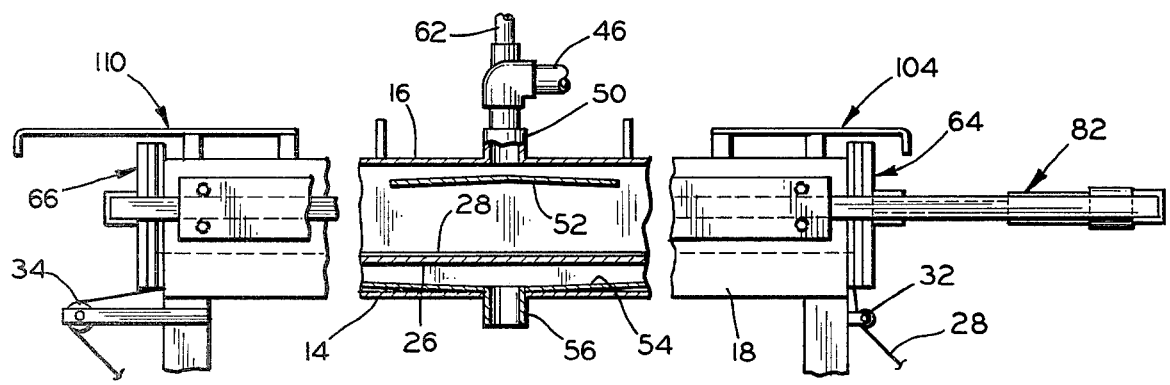
FIG. 2 is a somewhat enlarged, fragmentary side view in elevation, with parts broken away and with parts in section, of a filter housing embodying the invention.

Referring to FIGS. 1, 2 and 5, a stop 104 is employed to limit the extent to which the sealing member 64 can move away from the supply end opening of the housing 12. The stop 104 includes a horizontal leg 106 suitably supported on the top wall 16 of the housing 12 and a depending flange 108 extending downwardly into the path of the sealing member 64 so as to engage the outer surface of the backup plate 70 and limit the outward movement. Somewhat similarly, a second stop 110 (FIGS. 1, 2 and 6) serves to limit the outward movement of the second sealing member 66 away from the discharge end opening of the housing 12. The second stop 110 includes a horizontal leg 112 suitably mounted on the top wall 16 of the housing 12 and a depending flange 114 extending downwardly into the path of the sealing member 66 so as to engage the outer surface of the backup plate 74.

As best seen in FIG. 1, the outward movement of the sealing member 64 away from the supply opening as determined by the stop 104 is less than the outward movement of the sealing member 66 away from the outlet opening, as determined by the second stop 110. Greater outward movement of the second sealing member 66 is required to accommodate the used filter media 28 with the filter cake formed thereon since such cake can have a thickness of three inches or more in some instances, depending, of course, on the particular filter media used, the liquid being filtered, and the length of time the filter media is used before being changed.

In the operation of the sealing members, when they are in the open positions, as shown in FIG. 1, and fluid is supplied to the blind end of the cylinder 80, the piston rod 78 is extended until the resilient layer 68 of the sealing member 64 engages the flange 22. Further extension of the piston rod 78 moves the transverse supporting bar 84 away from the sealing member 64 to pull the connecting bars 86 and 88. This causes the second transverse supporting bar 90 to move the second sealing member 66 toward and against the sealing flange 24 to thereby seal both ends of the filter housing 12.

When the piston rod 78 is retracted into the cylinder 80, the sealing member 64 first moves outwardly, being supported through the flanges 100 and 102 on the connecting bars 86 and 88 until the stop flange 108 is reached. Further movement of the piston rod 78 into the cylinder 80 then pushes the connecting rods 86 and 88 toward the discharge end of the housing 12 to cause the transverse supporting bar 90 and the sealing member 66 to move outwardly until the sealing member 66 reaches the second stop flange 114.

Figure 3:
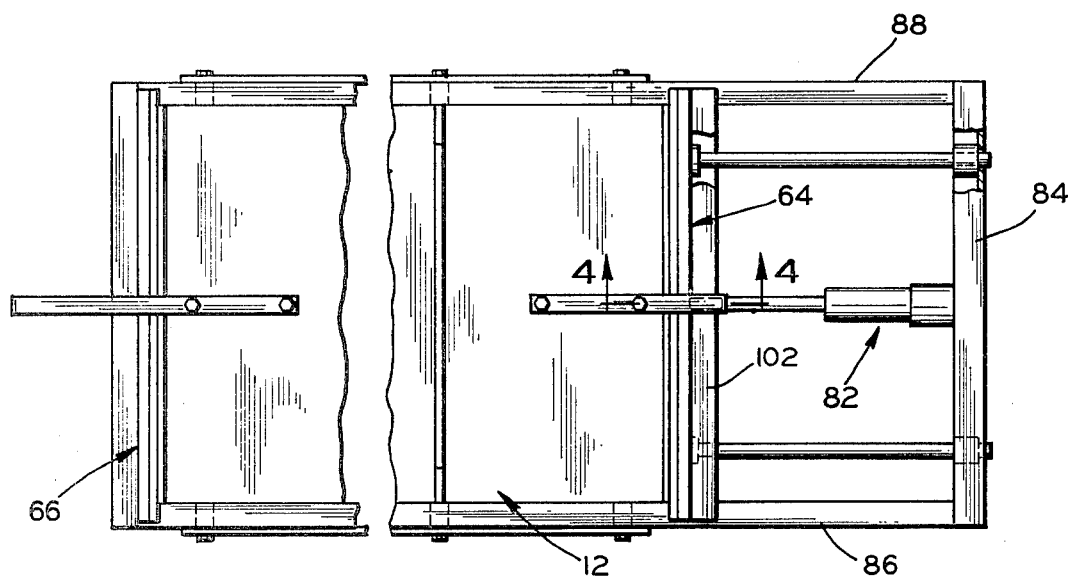
FIG. 3 is a fragmentary, schematic top view of the apparatus of FIGS. 1 and 2.

As shown in FIGS. 3 and 5, two tubular members 116 are positioned on opposite sides of the fluid-operated ram 82. When a single acting ram is employed, the tubular members 116 can be telescoping and contain tension springs which cause the sealing members 64 and 66 to move outwardly when pressure in the ram is reduced. When the ram is double acting, the tubular members 116 can simply be guides received in bearing blocks (not shown) in the transverse supporting member 84. This helps to prevent skewing and jamming of the mechanism particularly when wide filter housings are used. The tubular members 116 are not required in other instances.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Filtering apparatus comprising a housing having end openings, means for supporting filter media in said housing between said end openings, a filter supply roll for supplying filter media through one end opening to said filter supporting means, a takeup roll for receiving filter media through the other end opening from said supporting means, means for supplying liquid to be filtered to one side of said filter media supporting means, means for receiving filtered liquid on the other side of said filter media supporting means, a sealing member for each of said end openings, each of said sealing members comprising a backup plate and a resilient layer, a first transverse supporting bar spaced from one of said backup plates, a piston rod connected to one of said supporting bar and said one backup plate, a fluid-operated cylinder receiving said piston rod and connected to the other of said supporting bar and said one backup plate, two spaced connecting bars affixed to spaced portions of said supporting bar and extending along sides of said housing and beyond the other end opening, means for movably supporting said connecting bars at the sides of said housing, a second transverse supporting bar affixed to the backup plate of the other sealing member and connected to said connecting bars, first stop means for limiting movement of said one sealing member away from the one end opening, a second stop means for limiting movement of said other sealing member away from the other end opening.

2. Filtering apparatus according to claim 1 characterized by said second stop means being spaced farther from said other end opening than said first stop means is from said one end opening.

3. Filtering apparatus according to claim 1 wherein said piston rod is connected to said one backup plate and said fluid-operated cylinder is connected to said first supporting bar.

4. Filtering apparatus according to claim 1 characterized by said means for movably supporting said connecting bars comprising a plurality of rollers supported by and extending from the sides of said housing.

5. Filtering apparatus according to claim 1 characterized by means carried by said one backup plate and movably engaging said connecting bars to aid in slidably supporting said one backup plate.

6. Filtering apparatus comprising a housing having end openings, means for supporting filter media in said housing between said end openings, means for supplying filter media through one end opening to said filter supporting means, means for receiving filter media through the other end opening from said supporting means, means for supplying liquid under pressure to be filtered to one side of said filter media supporting means, a sealing member for each of said end openings, a first transverse supporting bar spaced from one of said sealing members, drive means connected between said one sealing member and said transverse supporting bar for moving said one sealing member and said transverse supporting bar toward and away from one another, at least one connecting bar affixed to said transverse supporting bar and extending along said housing and beyond the other end thereof, means for movably supporting said connecting bar, a second transverse supporting bar connected to the other sealing member and connected to said connecting bar, first stop means for limiting movement of said one sealing member away from the associated end opening, and second stop means for limiting movement of said other sealing member away from the associated end opening.

7. Filtering apparatus according to claim 6 characterized by said drive means comprising a fluid-operated ram.

8. Filtering apparatus according to claim 7 characterized by said fluid-operated ram comprising a piston connected to one of said one sealing member and said first transverse supporting bar and a cylinder connected to the other of said one sealing member and said first transverse supporting bar.

9. Filtering apparatus according to claim 6 characterized by a second connecting bar affixed to said transverse supporting bar and extending along said housing and beyond the other end thereof, means for movably supporting said second connecting bar, and said second transverse supporting bar also being connected to said second connecting bar.

10. Filtering apparatus according to claim 9 characterized by said means for movably supporting said connecting bars comprising a plurality of rollers supported by and extending from the sides of said housing.

11. Filtering apparatus according to claim 6 characterized by said second stop means being spaced farther from its associated end opening than said first stop means is from its associated end opening.

12. Filtering apparatus according to claim 6 characterized by said end openings having peripheral flanges against which said sealing members seal.

13. Filtering apparatus according to claim 6 characterized by each of said sealing members comprising a backup plate and a resilient layer.

14. Filtering apparatus according to claim 6 characterized by means carried by said one sealing member and engaging said connecting bar to aid in slidably supporting said one sealing member.

15. Filtering apparatus comprising a housing having end openings, means for supporting filter media in said housing between said end openings, means for supplying filter media through one end opening to said filter supporting means, means for receiving filter media through the other end opening from said supporting means, means for supplying liquid to be filtered to one side of said filter media supporting means, means for receiving filtered liquid on the other side of said filter media supporting means, a sealing member for each of said end openings, a rectangular frame surrounding sides of said housing and said backup sealing members, said frame comprising a first transverse supporting bar spaced from one of said sealing members, two spaced connecting bars affixed to spaced portions of said supporting bar and extending along sides of said housing and beyond the other end, and a second transverse supporting bar affixed to the other sealing member and to said connecting bars, a fluid-operated ram connected between said one sealing member and said first transverse supporting bar for causing relative movement between said one sealing member and said first transverse supporting bar, means movably supporting said connecting bars relative to said housing, and stop means for limiting movement of said sealing members away from the respective end openings.

16. Filtering apparatus according to claim 15 characterized by said stop means enabling movement of one of said sealing members farther away from the associated end opening than the other of said sealing members away from its associated end opening.

17. Filtering apparatus according to claim 15 characterized by means for movably supporting said connecting bars at the sides of said housing for longitudinal movement.

18. Filtering apparatus according to claim 17 characterized by said means for movably supporting said connecting bars comprising a plurality of rollers supported by and extending from the sides of said housing.

19. Filtering apparatus according to claim 15 characterized by said one sealing member having means extending beyond the side edges thereof and engaging said connecting bars to aid in supporting said one sealing member.

20. Filtering apparatus according to claim 19 characterized by said extending means comprising flange means engaging the upper surfaces of said connecting bars and the lower surfaces of said connecting bars.

* * * * *